US011536854B2

(12) United States Patent
Morton et al.

(10) Patent No.: US 11,536,854 B2
(45) Date of Patent: Dec. 27, 2022

(54) MULTIPLE FAULTY GLOBAL NAVIGATION SATELLITE SYSTEM SIGNAL DETECTING SYSTEM

(71) Applicant: Honeywell International Inc., Morris Plains, NJ (US)

(72) Inventors: Blaise Morton, Minnetonka, MN (US); Vibhor L Bageshwar, Rosemount, MN (US); Michael Ray Elgersma, Plymouth, MN (US)

(73) Assignee: Honeywell International Inc., Charlotte, NC (US)

( * ) Notice: Subject to any disclaimer, the term of this patent is extended or adjusted under 35 U.S.C. 154(b) by 348 days.

(21) Appl. No.: 16/858,311

(22) Filed: Apr. 24, 2020

(65) Prior Publication Data
US 2021/0333415 A1  Oct. 28, 2021

(51) Int. Cl.
*G01S 19/28* (2010.01)
*G01C 21/16* (2006.01)
(Continued)

(52) U.S. Cl.
CPC ............ *G01S 19/28* (2013.01); *G01C 21/165* (2013.01); *G01S 19/396* (2019.08); *G01S 19/47* (2013.01); *G01S 19/49* (2013.01); *G01S 19/54* (2013.01)

(58) Field of Classification Search
CPC ........ G01S 19/20; G01S 19/28; G01S 19/396; G01S 19/47; G01S 19/49; G01S 19/54; G01C 21/165
See application file for complete search history.

(56) References Cited

U.S. PATENT DOCUMENTS

| 5,926,132 A | * | 7/1999 | Brenner | G01S 19/20 |
| | | | | 342/357.29 |
| 6,049,304 A | * | 4/2000 | Rudel | G01S 19/41 |
| | | | | 342/357.34 |

(Continued)

FOREIGN PATENT DOCUMENTS

| CN | 105182391 A | 12/2015 |
| CN | 109683183 A | 4/2019 |

(Continued)

OTHER PUBLICATIONS

Broshears E et al: "Ultra-Wideband Aided Carrier Phase Ambiguity Resolution in Real-Time Kinematic GPS Relative Positioning", Proceedings of the 26th International Technical Meeting of the ION Satellite Division, Sep. 2013, pp. 1277 through 1284, ION GNSS+.

(Continued)

*Primary Examiner* — Bernarr E Gregory
*Assistant Examiner* — Fred H Mull
(74) *Attorney, Agent, or Firm* — Fogg & Powers LLC

(57) ABSTRACT

A multiple faulty global navigation satellite signal detecting system is provided. The system includes at least one pair of spaced antennas, at least one aiding source and processor. The at least one pair of spaced antennas are configured to receive satellite signals from a plurality of satellites. The at least one aiding source is used to generate aiding source position estimate signals. The processor is in communication with each antenna and the at least one aiding source. The processor is configured to determine signals blocks. The signal blocks being a collection of subsets of the determined difference signals and a covariance matrix for the difference signals. The processor further configured to generate a union of good signals from all the good blocks and a complementary set of bad signals.

20 Claims, 6 Drawing Sheets

(51) Int. Cl.
    *G01S 19/49*     (2010.01)
    *G01S 19/39*     (2010.01)
    *G01S 19/54*     (2010.01)
    *G01S 19/47*     (2010.01)

(56) References Cited

U.S. PATENT DOCUMENTS

| | | | |
|---|---|---|---|
| 6,114,988 | A | 9/2000 | Schipper et al. |
| 6,639,549 | B2 | 6/2003 | Vanderwerf et al. |
| 7,219,013 | B1 | 5/2007 | Young et al. |
| 7,292,185 | B2 | 11/2007 | Whitehead et al. |
| 7,555,262 | B2 | 6/2009 | Brenner |
| 8,035,557 | B2 | 10/2011 | Thomson et al. |
| 8,803,736 | B2 | 8/2014 | Dai et al. |
| 8,976,064 | B2 | 3/2015 | Brenner |
| 9,341,718 | B2 | 5/2016 | Vanderwerf |
| 9,507,028 | B1 | 11/2016 | Yoo |
| 9,593,962 | B2 | 3/2017 | Brenner et al. |
| 9,599,721 | B2 | 3/2017 | Dai et al. |
| 9,645,245 | B2 | 5/2017 | Osipov et al. |
| 9,829,582 | B2 | 11/2017 | Wu et al. |
| 9,880,021 | B2 | 1/2018 | Brenner et al. |
| 9,915,734 | B2 | 3/2018 | Scheitlin et al. |
| 10,054,687 | B2 | 8/2018 | Whitehead |
| 10,114,126 | B2 | 10/2018 | Wu et al. |
| 10,234,564 | B2 | 3/2019 | Whitehead |
| 10,261,194 | B2 | 4/2019 | Kundak et al. |
| 10,495,761 | B2 | 12/2019 | Skalicky et al. |
| 2004/0058645 | A1 | 3/2004 | Brenner |
| 2014/0074397 | A1 | 3/2014 | Vanderwerf |
| 2015/0048973 | A1 | 2/2015 | Whitehead |
| 2016/0290826 | A1 | 10/2016 | Brenner et al. |
| 2017/0139052 | A1 | 5/2017 | Skalicky et al. |
| 2017/0192103 | A1 | 7/2017 | Kundak et al. |
| 2019/0212456 | A1 | 7/2019 | Schipper et al. |
| 2019/0377095 | A1 | 12/2019 | Brenner |

FOREIGN PATENT DOCUMENTS

| | | | | |
|---|---|---|---|---|
| CN | 110161546 | A | 8/2019 | |
| CN | 110221332 | A | 9/2019 | |
| CN | 110645979 | A | 1/2020 | |
| GB | 2429128 | A | 2/2007 | |
| WO | WO-03017018 | A1 * | 2/2003 | ............ G01S 19/55 |
| WO | 2019203679 | A1 | 10/2019 | |

OTHER PUBLICATIONS

European Patent Office, "Communication pursuant to Article 94(3) EPC from EP Application No. 19178562.5", from Foreign Counterpart to U.S. Appl. No. 16/005,403, dated Feb. 19, 2021, pp. 1 through 8, Published: EP.
U.S. Patent and Trademark Office, "Office Action", U.S. Appl. No. 16/005,403, dated Apr. 29, 2020, pp. 1 through 28, Published: US.
Bhatti, Umar Iqbal et al., "Detecting Multiple failures in GPS/INS integrated system: A Novel architecture for Integrity Monitoring", Centre for Transport Studies, Department of Civil and Environmental Engineering, Imperial College London, 2009, pp. 1-18, vol. 8, No. 1: 26-42, Published: Journal of Global Positioning Systems.
European Patent Office, "Extended European Search Report from EP Application No. 19178562.5", from Foreign Counterpart to U.S. Appl. No. 16/005,403, dated Oct. 25, 2019, pp. 1-10, Published: EP.
Giorgi et al., "GNSS Carrier Phase-Based Attitude Determination", Recent Advances in Aircraft Technology Chapter 9, 2012, pp. 1 through 30, IntechOpen, www.intechopen.com.
Hwang, Patrick Y., "Applying NIORAIM to the Solution Separation Method for Inertially-Aided Aircraft Autonomous Integrity Monitoring", Proceedings of the 2005 Natl. Technical Mtg. of the Institute of Navigation, 2005, pp. 992-1000, pp. 1-4, Published: ION Publications, San Diego, CA.
Li et al., "A Low-Cost INS-Integratable GNSS Ultra-Short Baseline Attitude Determination System", Sensors 2018, Jul. 1, 2018, pp. 1 through 19, MDPI.
Perepetchai, "Global Positioning System Receiver Autonomous Integrity Monitoring", School of Computer Science, Aug. 2000, pp. 1-109, McGill University, Montreal.
Wang et al., "Rover Autonomous Integrity Monitoring of GNSS RTK Positioning Solutions with Multi-Constellations", 22nd International Meeting of the Satellite Division of The Institute of Navigation, Sep. 22-25, 2009, pp. 1361-1370, Savannah, GA.
U.S. Patent and Trademark Office, "Notice of Allowance", U.S. Appl. No. 16/005,403, dated Nov. 13, 2020, pp. 1 through 16, Published: US.
European Patent Office, "Communication pursuant to Article 94(3) EPC from EP Application No. 19178562.5", from Foreign Counterpart to U.S. Appl. No. 16/005,403, dated Aug. 21, 2020, pp. 1 through 5, Published: EP.
European Patent Office, "Extended European Search Report from EP Application No. 21167918.8", from Foreign Counterpart to U.S. Appl. No. 16/858,311, dated Sep. 23, 2021, pp. 1 through 7, Published: EP.

* cited by examiner

MULTIPLE FAULTY GLOBAL NAVIGATION SATELLITE SYSTEM SIGNAL DETECTING SYSTEM

BACKGROUND

High-integrity navigation systems mounted on vehicles are required as applications of commercial aviation evolve over time. For example, urban air mobility applications require high-integrity navigation systems as aircraft operate over high-population, high-density urban environments. As a further example, commercial air transport applications require high-integrity navigation systems to support single pilot operations.

Navigation systems mounted on vehicles use inertial sensors (rate gyros and accelerometers) in combination with sensors such as global navigation satellite system (GNSS), magnetometers, altimeters (and possibly other sensors such as radars, cameras, lidars, start trackers, etc) and at least one fast processor to estimate the three-dimensional (3D) position, 3D velocity, and 3D angular orientation or attitude, or vehicle kinematic states, of the vehicle. Navigation systems use filters to fuse the sensor measurements to estimate the vehicle kinematic states. The sensors contribute measurements that can be fused together by the navigation filter to estimate the various vehicle kinematic states. The vehicle attitude (pitch angle and roll angle) can be estimated by the filter and the processor using the angular velocity measured by the rate gyros, the acceleration measured by the accelerometers, and, depending on the vehicle trajectory, the GNSS sensors. The vehicle heading angle can be estimated by the filter and the processor using the angular velocity measured by rate gyros, the local magnetic field measured by the magnetometers, and, depending on the vehicle the trajectory, the vehicle track angle by the GNSS pseudo-range or velocity measurements.

A key requirement for a navigation system is the availability (accuracy, integrity, and continuity) of heading. Heading may be determined by integrating the gyro measurements and bounding the integrated gyro measurements using either a magnetometer or track angle computed from the GNSS pseudorange or velocity measurements. Magnetometer computed heading, however, has two limitations. First, the magnetometer has to be calibrated and magnetic disturbances from the Earth's crust, solar flares, and onboard vehicle sources can cause heading errors that exceed heading requirements. The heading computed using magnetometers mounted on vehicles with rapidly changing local magnetic fields is often inaccurate because the calibration can't keep up with the changing magnetic field. Second, the Earth's magnetic field requires sufficient horizontal resolution to determine heading and the direction of the Earth's magnetic field close to the magnetic poles is nearly vertical. As a result, magnetic heading is unavailable for any flights close to the magnetic poles since GNSS heading computed from pseudorange or velocity measurements requires vehicle maneuvers that don't typically occur during flights. In summary, long duration flights over the poles result in situations where the above described system can't satisfy heading requirements because the heading angle is computed from the vertical rate gyro and it is subject to drift.

Another approach to determine heading is to use the GNSS carrier phase measurements from two or more onboard GNSS antennas that are separated by a known distance called a baseline. GNSS carrier phase heading is computed using the relative distance from the antennas to the GNSS satellites. Using carrier phase measurements, the relative distance from the antennas to the GNSS satellites is the sum of whole integer frequency cycles plus partial integer frequency cycles. GPS carrier phase heading requires the computation of at least one difference between carrier phase measurements and the computation of the whole integer frequency cycles in these differential carrier phase measurements and it is referred to as integer ambiguity resolution. The advantages of GNSS carrier phase heading are that heading is globally available including close to the magnetic poles, during straight trajectory flights, and environments with rapidly changing magnetic fields. For use in navigation systems, the integrity of the integer ambiguity resolution algorithms must be assured. The limitations of GNSS carrier phase heading are that the integer ambiguities must be resolved in the presence of carrier phase noise and multipath noise while the vehicle is on the ground (stationary or moving) or in the air (hovering or moving).

GNSS 3D Attitude Determination using integer ambiguity resolution of carrier phase measurements can be a powerful solution for determining 3D vehicle attitude and, in particular, heading. While the ambiguity resolution problem has been studied extensively, methods to assure the integrity of the solution necessary for commercial aviation applications on the ground and in the air in the presence of carrier phase noise and multipath noise are currently immature at best. Indeed, the integrity of the integer ambiguity resolution algorithms pose the biggest challenge when using GPS carrier phase heading in high-integrity navigation applications.

SUMMARY

The following summary is made by way of example and not by way of limitation. It is merely provided to aid the reader in understanding some of the aspects of the subject matter described. Embodiments provide a receiver based integer ambiguity monitoring system that operates in the presence of carrier phase noise and GNSS multipath noise using GNSS pseudorange and carrier phase measurements. The system detects and excludes faulty GNSS satellite signals and it identifies an optimal set of GNSS satellite signals that should be used to determine heading.

In one embodiment, a multiple faulty global navigation satellite signal detecting system is provided. The system includes at least one pair of spaced antennas, at least one aiding source and processor. The at least one pair of spaced antennas are configured to receive satellite signals from a plurality of satellites. The at least one aiding source is used to generate aiding source position estimate signals and heading rate signals. The processor is in communication with each antenna and the at least one aiding source. The processor is configured to, determine an estimate of a fractional difference in a carrier phase and standard deviation for each satellite signal received by the spaced antennas to generate single-difference signals with noise levels, determine a unit vector in a direction of an associated satellite in north-east-down (NED) coordinates from the received satellite signals and an aiding source position estimate signal from the at least one aiding source, determine difference signals by at least selecting a list of good single-difference signals with noise levels to use in a current epoch, determine signal blocks, the signal blocks being a collection of subsets of the determined difference signals and a covariance matrix for the difference signals, determine which difference signals are bad by, determining an integer ambiguity vector for the signals in each signal block to generate a phase difference vector, determining estimated NED coordinates for a baseline vector and an associated heading solution from the phase difference vector, comparing at least one of, a determined heading solution with a predicted heading solution based on previous solutions and heading rate signals, a geometry of the determined NED coordinates with satellite coordinates and an estimated baseline length with a known baseline length, and generate a union of good signals from all the good blocks and a complementary set of bad signals based on the comparison.

In another example embodiment, a method of detecting multiple faulty global navigation satellite signals is provided. The method includes determining an estimate of a fractional difference in a carrier phase and standard deviation for each satellite signal received by spaced antennas to generate single-difference signals with noise levels; determining a unit vector in a direction of an associated satellite in north-east-down (NED) coordinates from the received satellite signals and an aiding source position estimate signal from at least one aiding source; determining difference signals by at least selecting a list of good single-difference signals with noise levels to use in a current epoch; determining signals blocks, the signal blocks being a collection of subsets of the determined difference signals and a covariance matrix for the difference signals, determining which difference signals are bad by, determining an integer ambiguity vector for the signals in each signal block to generate a phase difference vector, determining estimated NED coordinates for a baseline vector and an associated heading solution from the phase difference vector, comparing at least one of, a determined heading solution with a predicted heading solution based on previous solutions, a geometry of the determined NED coordinates with satellite coordinates, and an estimated baseline length with a known baseline length, and generating a union of good signals from all the good blocks and a complementary set of bad signals based on the comparing.

In yet another embodiment, another method of detecting multiple faulty global navigation satellite signals is provided. The method includes determining an estimate of a fractional difference in carrier phase and standard deviation between each satellite signal from each satellite of a plurality of satellites received at a pair of spaced antennas; determining a unit vector from each satellite in north-east-down (NED) coordinates associated with each satellite signal; determining NED coordinates of a baseline length between the pair of spaced antennas using a pitch and roll vector from an inertial navigation system; determining a covariance matrix for one of single-difference and double-difference data using the determined estimate of a fractional difference in carrier phase and standard deviation and a select reference signal; building blocks of one of single-difference and double difference data and covariance matrices; determining integer ambiguity estimate baseline vectors for each signal block using one of the single-difference and double difference data and covariance matrices, the determined unit vector from each satellite in NED coordinates associated with each satellite signal and the determined NED coordinates of a baseline length between the pair of spaced antennas using a pitch and roll vector; determining an estimate of heading and residual metrics based on the determined integer ambiguity estimate baseline vectors; identifying at least one of bad signals and good signals using the determined estimate of heading and residual metrics, an identification of signals contained in the building blocks of the one of signal difference and double difference data and stored data; and using only good signals in determining navigation information.

BRIEF DESCRIPTION OF THE DRAWINGS

Embodiments can be more easily understood and further advantages and uses thereof will be more readily apparent, when considered in view of the detailed description and the following figures in which.

In accordance with common practice, the various described features are not drawn to scale but are drawn to emphasize specific features relevant to the subject matter described. Reference characters denote like elements throughout Figures and text.

DETAILED DESCRIPTION

Figure 1:
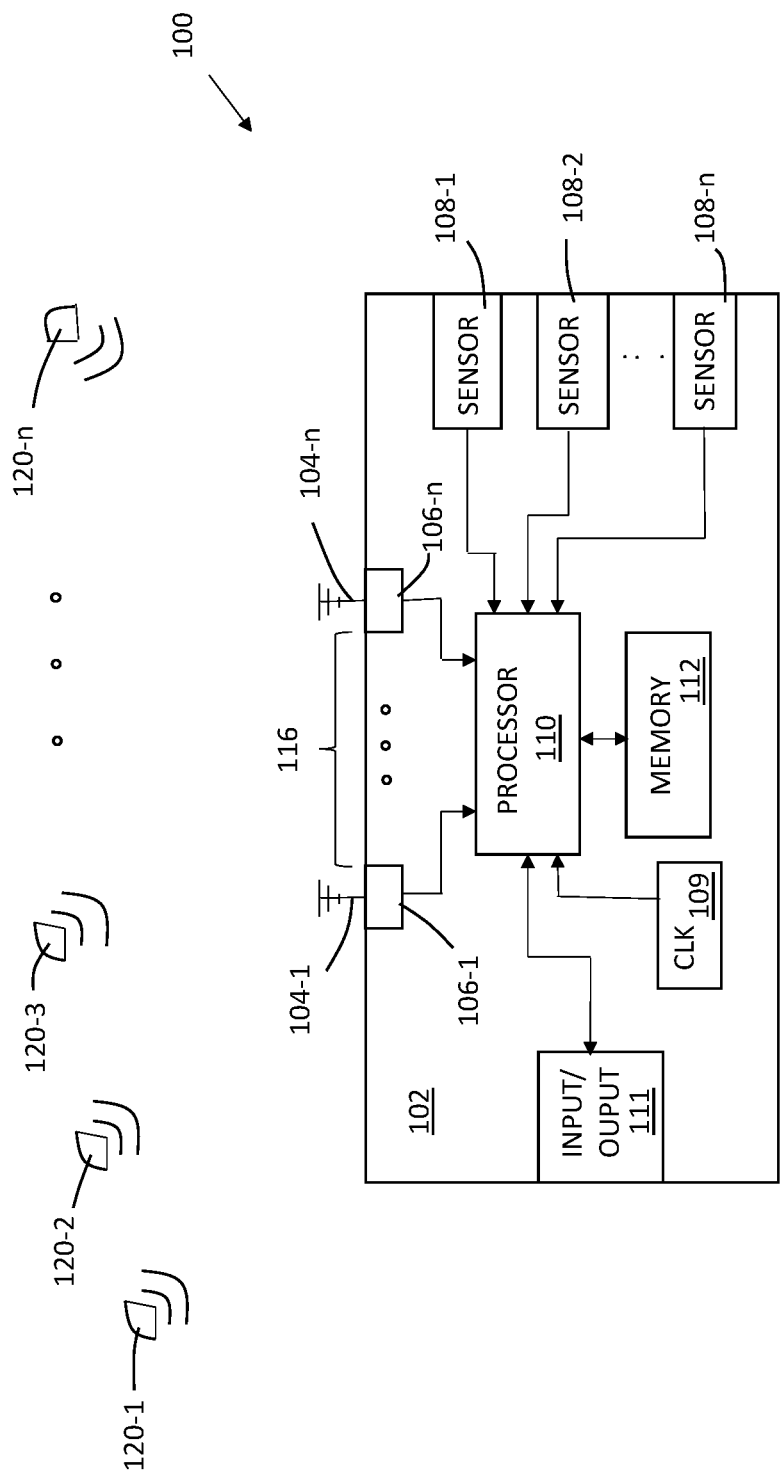
FIG. 1 is a multiple faulty global navigation satellite signal detecting system according to one exemplary embodiment.

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide a receiver based integer ambiguity monitoring system that operates in the presence of carrier phase noise and GNSS multipath noise using GNSS pseudorange and carrier phase measurements. The system detects and excludes faulty GNSS satellite signals and it identifies an optimal set of GNSS satellite signals that should be used to determine heading. Further, embodiments use both carrier phase and pseudorange measurements to detect and exclude any number of faulty GNSS satellite signals to improve and compute the integrity of the resolved integer ambiguities and, as a result, GNSS carrier phase heading. The maximum number of faulty signals that can be identified is a function of the number of GNSS satellite signals that are available at each measurement time epoch.

Currently, GNSS receivers use receiver autonomous integrity monitoring (RAIM) to perform fault detection and exclusion of one faulty GNSS satellite signal to determine position. The RAIM algorithm detects faults by performing consistency checks, in the form of statistical tests, on the pseudorange measurements of at least 5 in view GNSS satellites. The RAIM algorithm detects and excludes faults by performing consistency checks, in the form of statistical tests, on the pseudorange measurements of at least 6 in view GNSS satellites. RAIM implementations are not unique. However, at its core, RAIM uses 5 or 6 in-view GNSS satellites to estimate the GNSS position solution. For the remaining in-view GNSS satellites, RAIM computes a pseudorange measurement residual. This residual is compared to a threshold value based on the probability of false alarm to assure the integrity of the measurements.

The limitations of the RAIM algorithms are that they are a function of the GNSS satellite geometry and the number of in view GNSS satellites, and it determines the availability of GNSS position using pseudorange measurements. The receiver based integer ambiguity monitoring embodiments described herein assures the integrity of the GPS heading computed from the integer ambiguity resolution algorithms using pseudorange measurements and carrier phase measurements. For a specified integer m (2, 3, etc.) the approach uses mathematical combinatorics to group the single or double-differenced signals into specific subsets (called blocks) having two properties.

In an embodiment, a test performed on each subset that reliably determines if one or more signal in that subset is bad. If m or fewer signals are bad, the union of signals in good subsets is exactly the set of good single or double-differenced signals. This construction works for any single or double-difference integer ambiguity approach and it is applicable even when only 2 GNSS antennas are available (single baseline case). The test to show a subset contains a bad signal uses measurements from previous epochs as well as an estimate of baseline length and a test for geometric consistency with the satellite geometry.

Moreover, the high-integrity integer ambiguity resolution embodiments described herein provide navigation products with heading estimates that satisfy heading requirements that can't be satisfied by magnetic heading or GNSS based heading computed from GNSS pseudorange/velocity measurements.

Referring to FIG. 1, an illustration of a multiple faulty global navigation satellite signal detecting system 100 in an example embodiment is illustrated. This example embodiment includes a vehicle 102 with a plurality of antennas 104-1 through 104-n designed to detect satellite signals from a plurality of satellites 120-1 through 120-n. The antennas 104-1 through 104-n are spaced a select distance 116 (baseline length) from each other. Within the vehicle 102 is at least one receiver 106-1 through 106-n designed to receive the satellite signals detected by the spaced antennas 104-1 through 104-n. The receivers 106-1 through 106-n are in communication with a processor 110 (or controller). Further included in the vehicle 102 are sensors 108-1 through 108-n (aiding sources) that are in communication with the processor 110. Examples of sensors (generally designated as 108) include, but are not limited to gyroscopes, magnetometers, inertial navigation systems, etc. The sensors 108 provide sensor data to the processor 110. Further illustrated in FIG. 1 is a memory 112 that is also in communication with the processor 110. The memory 112, in an embodiment, stores operation instructions that are implemented by the processor 110. The memory 112 may also store sensor and receiver data. Further illustrated in the vehicle is an input/output 111 and a clock 109. The input/output 111 provides a communication path to and from the processor 110. For example, the input 111 may provide a communication path for instructions that are stored in memory 112 and the output 111 may provide a communication path to display determined 3D attitude solutions or a vehicle control system that controls at least in part guidance of the vehicle 102 based on the attitude solutions. Clock signals from the clock 109 are used by the processer for timing purposes and, as discussed below, to index time epoch information in the memory 112.

In general, the processor 110 may include any one or more processors, microprocessors, a digital signal processor (DSP), an application specific integrated circuit (ASIC), a field program gate array (FPGA), or equivalent discrete or integrated logic circuitry. In some example embodiments, processor 110 may include multiple components, such as any combination of one or more microprocessors, one or more controllers, one or more DSPs, one or more ASICs, one or more FPGAs, as well as other discrete or integrated logic circuitry. The functions attributed to the processor herein may be embodied as software, firmware, hardware or any combination thereof. The processor 110 may be part of a system controller or a component controller. The memory 112, as discussed above, may include computer-readable operating instructions that, when executed by the processor 110 provides functions of the multiple faulty global navigation satellite system signal detecting system. The computer readable instructions may be encoded within the memory 112. Memory 112 is an appropriate non-transitory storage medium or media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

FIGS. 2-6 provide example block diagrams (or flow diagrams), 130, 200, 250, 300, and 400. The block diagrams 130, 200, 250, 300, and 400 are presented as a block or series of blocks that are implemented by the processor 110 of the multiple faulty global navigation satellite signal detecting system 100. Blocks in the block diagrams 130, 200, and 300 are presented in sequential order. The sequence, however, may be different in different embodiments. Hence embodiments are not limited to the sequential order illustrated in FIGS. 2-6.

Figure 2:
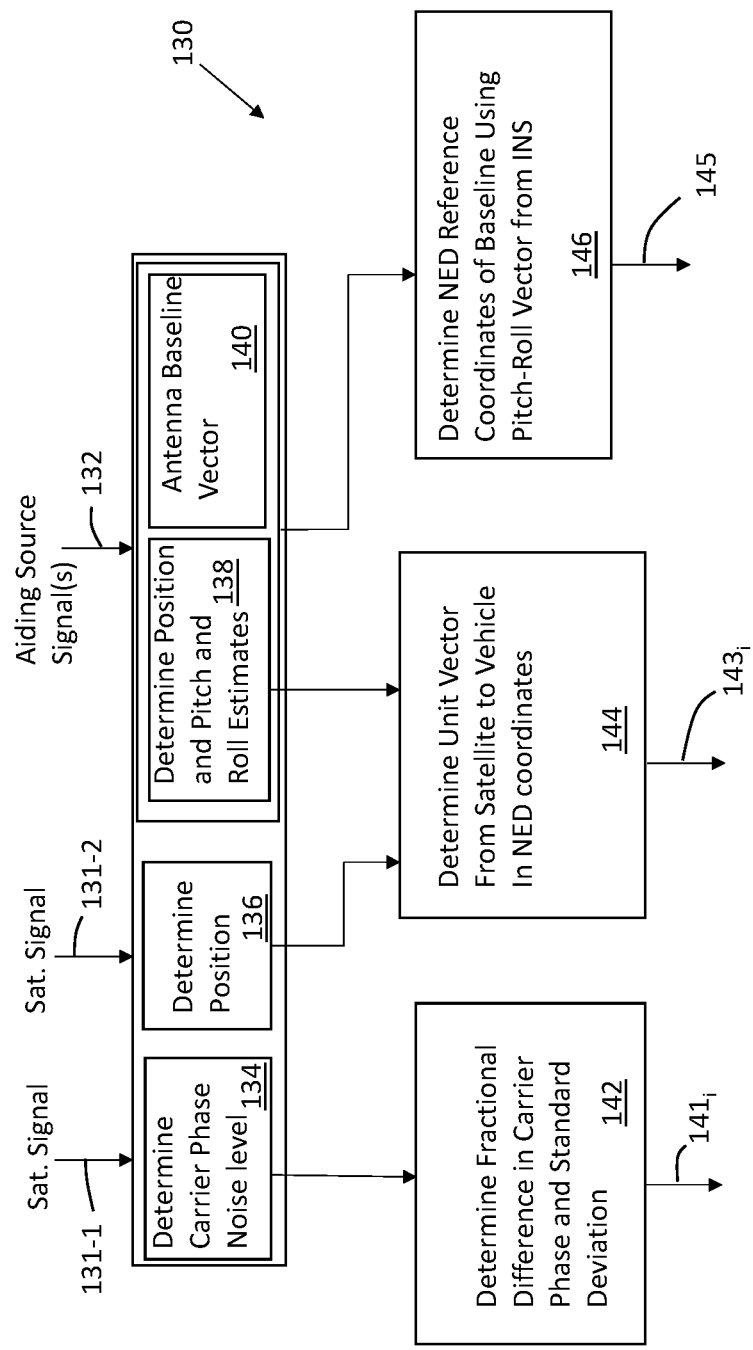
FIG. 2 is a formation gathering and processing block diagram according to one exemplary embodiment.

FIG. 2 is a formation gathering and processing block diagram 130 that illustrates how information from satellite signals 131-1 and 131-2 (received at a pair of vehicle mounted GNSS antennas 104-1 and 104-2), information from an aiding source 108 signal 132 such as a vehicle mounted inertial navigation system (INS) and other stored information is used to produce inputs needed to determine vehicle heading information using data from a single satellite having index i in an example embodiment. In this example, there are N satellites 120 for i=1, . . . , N being monitored by the two GNSS receivers 106-1 and 106-2.

Two of the three outputs from block diagram 130, outputs 141 and 143, depend on the index i=1, . . . ,N that identifies the different satellites 120 being monitored at each epoch (i.e. sample time). The corresponding computations in processes 142 and 144 for i=1, . . . ,N are independent for each index i, and can be performed in parallel if desired. The remaining output 145 is the same for all i, and only needs to be computed once per time epoch.

The overall process 130 in block diagram 130 has two front-end sources of data, the satellite signals 131-1 and 131-2 from respective satellite receivers 106-1 and 106-2 and an aiding source signal 132, such as INS signal from an INS system generally designated as 108 of the vehicle 102. The processor 110 receives satellite data signals from the two GNSS receivers 106-1 and 106-2 via antennas 104-1 and 104-2 respectively. Further in an embodiment, vehicle-body coordinates of the antenna baseline 116 are stored in memory 112 for use by the processor 110.

At block (134), fractional portions of carrier phases of the signal from a single satellite (indexed by i=1, . . . , N) to the two antennas and receiver estimates of the noise levels in those phase estimates are determined based on the received satellite signals 131-1 and 131-2. At block (142) an input from the output of block (134) is used to determine the single difference output $141_i$. The output $141_i$ consists of an estimate of the fractional difference in carrier phase from satellite i together with a standard deviation for the error of that estimate.

A position of the satellite i, the satellite signal currently being processed, is determined at block (136) using earth-centered-earth-fixed (ECEF) coordinates. This information along with an estimated position of the vehicle from the INS system 108 data in local north-east-down (NED) coordinates is input into block (144). At block (144) the satellite ECEF coordinates are converted to NED coordinates and a unit vector in the direction of the satellite from the vehicle in NED coordinates is determined. That unit vector is output 143, as illustrated in FIG. 2.

At block (146), the antenna baseline vector in body coordinates in block (140) and vehicle pitch and roll angle estimates from the vehicle INS 108 from block (138) are used to determine a set of reference coordinates of the baseline vector in NED coordinates. The reference coordinates are, by definition, the coordinates of the baseline vector of the antenna pair under the assumption that the direction of that vector in NED coordinates is North. Output 145 of block (146) is that set of reference coordinates.

Figure 3:
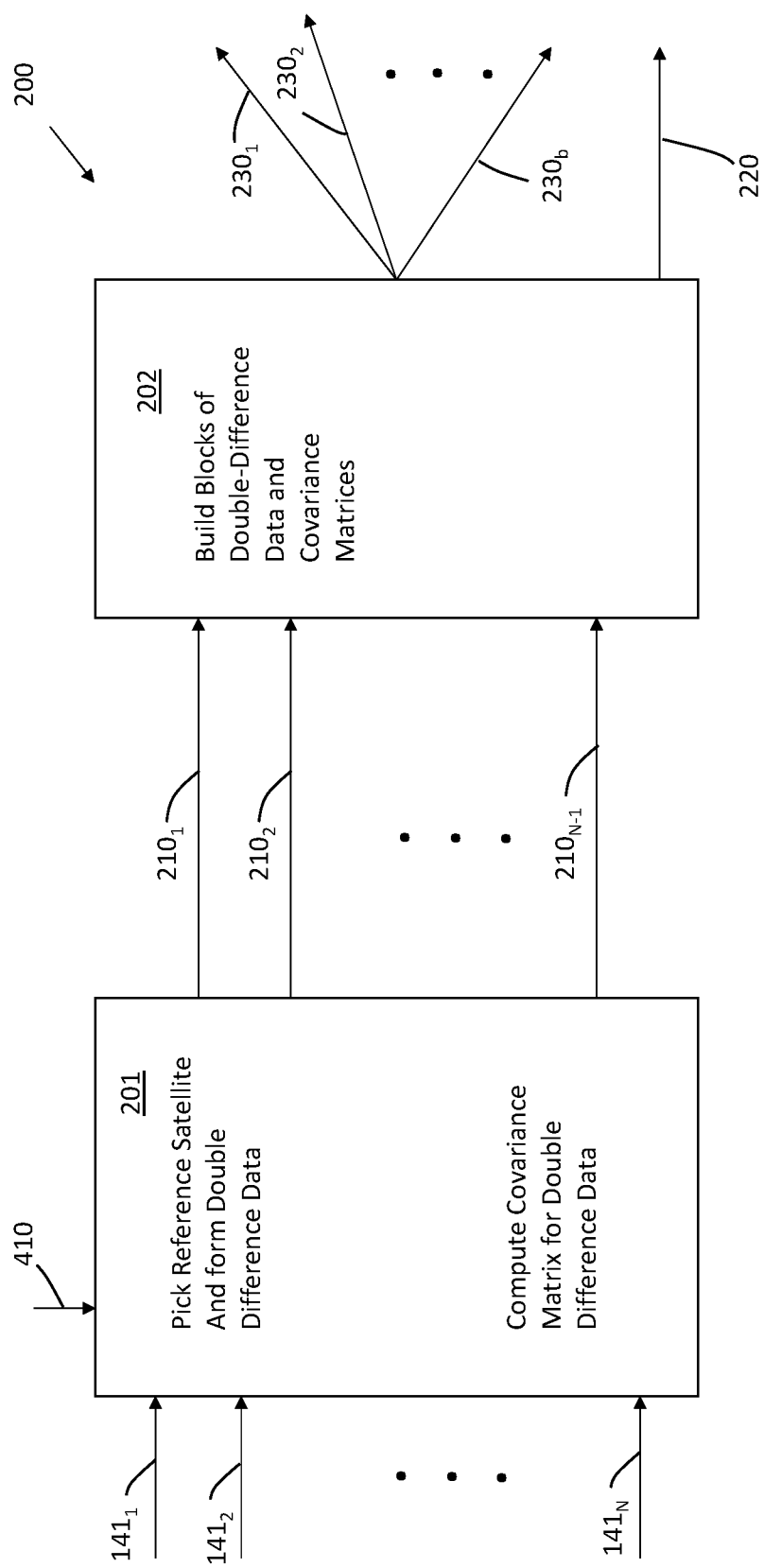
FIG. 3 is a double-difference block diagram according to one exemplary embodiment.

FIG. 3 is a double difference block diagram 200 of a double-difference embodiment illustrating that the single-difference data (differences in fractional carrier phase and pseudorange between the two antennas for each satellite) is converted into double-difference data in an embodiment. Also, a covariance matrix for double-difference errors is computed. Then the N−1 double-difference values, with covariances, are grouped into b blocks of subsets (called signal blocks) for further analysis.

In FIG. 3, all of the outputs $141_i$ for i=1, . . . , N, of block (142) of the block diagram 130 are combined as inputs to block (201) of block diagram 200. At block (201) double-difference data is determined from inputs $141_i$ for i= 1, . . . , N. Input 410 to block (201), in this example, provides information about good and bad satellite signals that is used to determine the reference satellite used in the double-difference computations. The outputs of block diagram 200 are the b signal blocks (subsets of double difference data) $230_j$ for j=1, . . . , b along with the output 220 that describes how the b signal blocks are defined.

At each epoch, block (201) in the double difference block diagram 200, starts with a list of good and bad satellite signals from the previous epoch (via input 410). Also, via inputs $141_i$ for i=1, . . . , N, block (201) receives the single-difference signals and noise levels from block (142) of block diagram 130. Block (201) selects the list of good single-difference signals to use in the current epoch. One of these good signals becomes the reference single-difference signal that is subtracted from all the other single-difference signals to produce the double difference signals $210_i$ for i= 1, . . . , N−1. Also in the outputs $210_i$ are the components of the covariance matrix for the N−1 double-differenced signals.

Block (202) of block diagram 200 uses the input double-difference signals $210_i$ and associated covariance matrix and produces a collection of b subsets (called signal blocks) of those signals along with the associated covariance matrix for each signal block. The output signal blocks and associated covariance matrices are $230_j$ for j=1, . . . , b. The other output 220 from process 202 identifies which signals are contained in each of the signal blocks. This information will be used at block (405), described below, when it decides which signals monitored in the current epoch are good and which are bad.

Figure 4:
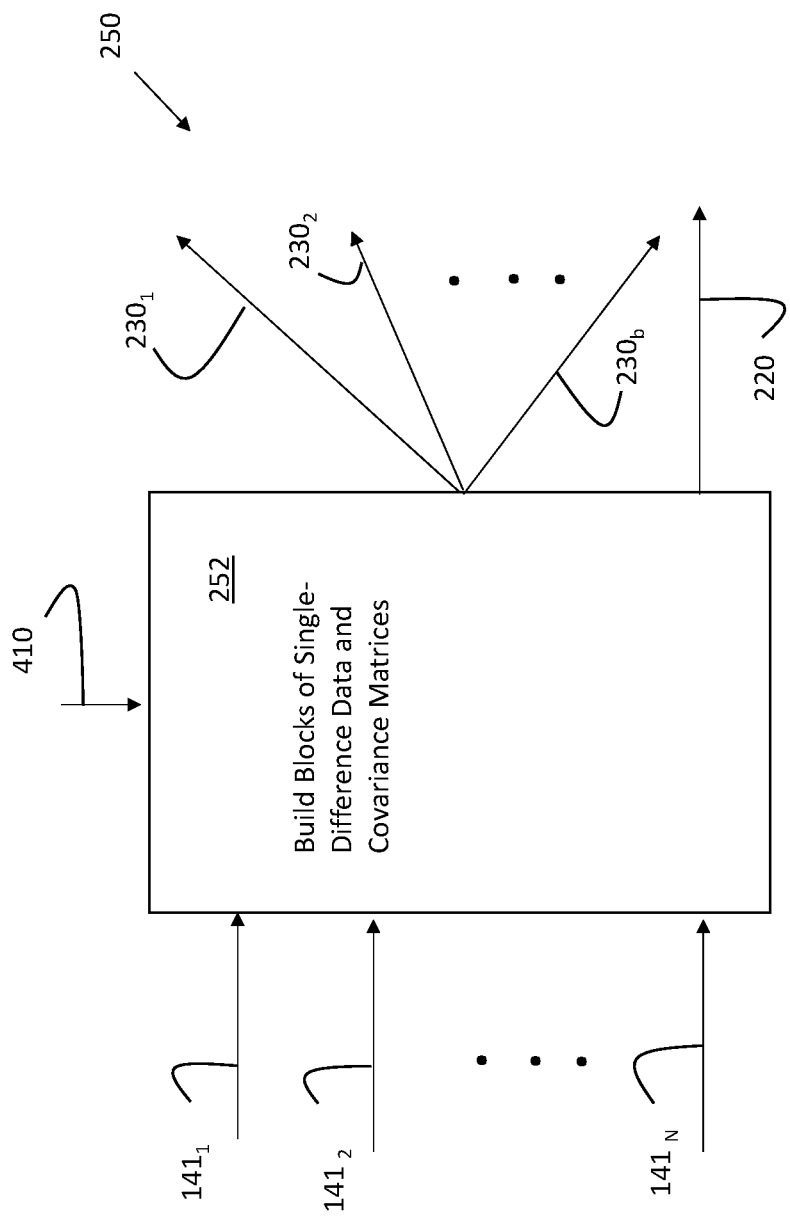
FIG. 4 is a signal-difference block diagram according to one exemplary embodiment.

FIG. 4 illustrates a single-difference block diagram 250 showing that the single-difference data (differences in fractional carrier phase and pseudorange between the two antennas for each satellite) is collected in an embodiment. Also, a covariance matrix for single-difference errors is computed. Then the N single-difference values, with covariances, are grouped into b blocks of subsets (called signal blocks) for further analysis.

All of the outputs $141_i$ for i=1, . . . , N, of block (142) of block diagram 130, discussed above, are combined as inputs to block (252) in this single difference embodiment. Input 410 provides information about good and bad satellite signals that is used to determine which of these input signals will be used to make signal blocks (subsets). The outputs of block diagram 250 are the b signal blocks (subsets of single-difference data) $230_j$ for j=1, . . . , b along with the output 220 that describes how the b signal blocks are defined.

At each epoch, block (252) of block diagram 250 starts with a list of good and bad satellite signals from the previous epoch (via input 410). Also, via inputs $141_i$ for i=1, . . . , N, block (252) receives the single-difference signals and noise levels from block 142. Block (252) then selects the list of good single-difference signals to use in the current epoch.

As discussed, block (252) uses the input single-difference signals $141_i$ for i=1, . . . , N and associated covariance matrix and produces a collection of b subsets (called signal blocks) of those signals along with the associated covariance matrix for each signal block. The output signal blocks and associated covariance matrices are $230_j$ for j=1, . . . , b. The other output 220 from block (252) identifies which signals are contained in each of the signal blocks. This information will be used by block 405, discussed below, when it decides which signals monitored in the current epoch are good and which are bad.

Figure 5:
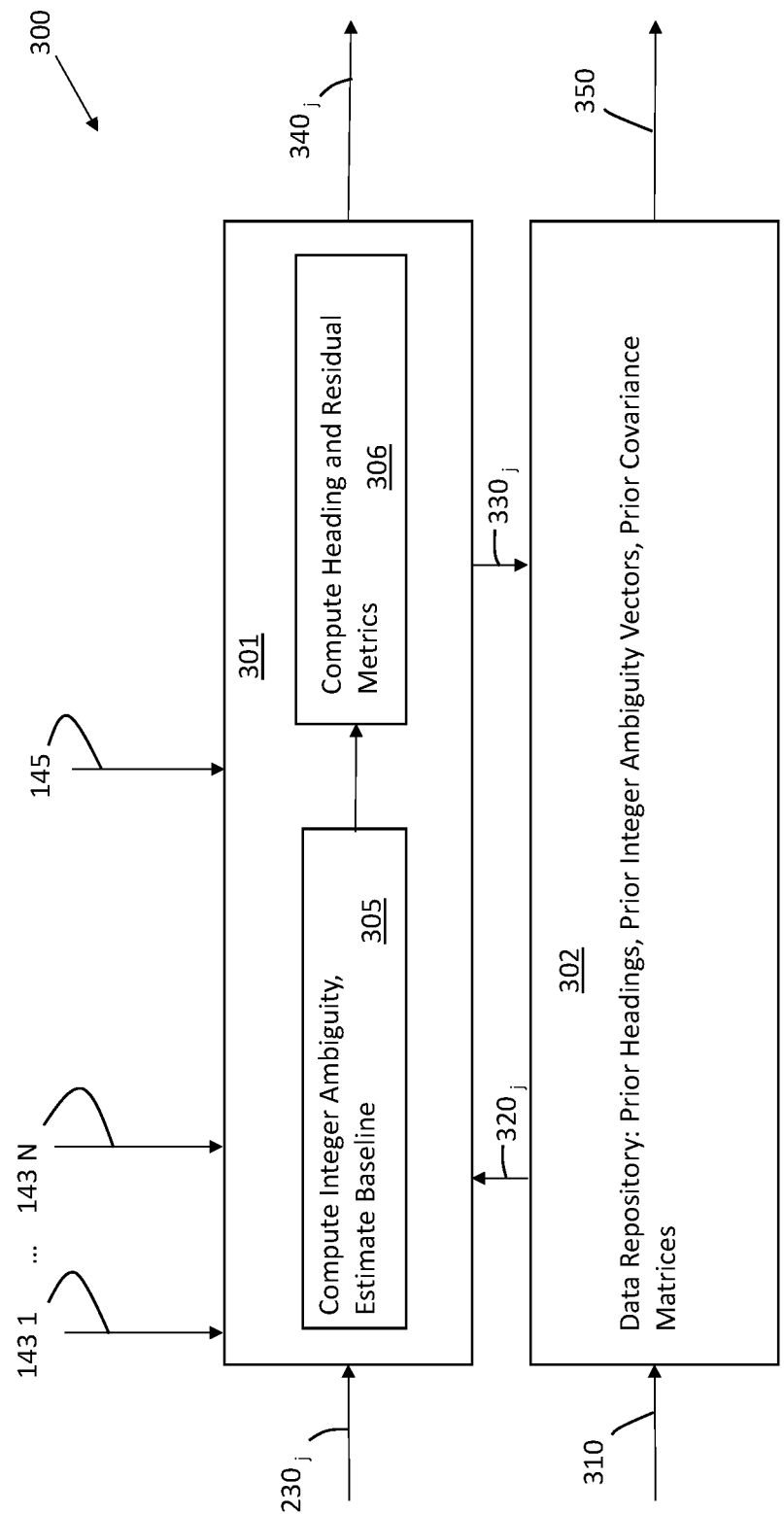
FIG. 5 is an epoch information block diagram according to one exemplary embodiment.

FIG. 5 is an epoch information block diagram 300 showing how single or double-difference values and covariances for signal-block j are processed to compute an integer ambiguity vector, baseline, heading, and residual metrics in an example embodiment. There are b signal blocks indexed by j=1, . . . , b. Block diagram 300 illustrates how the outputs from the b signal blocks and information sent from block (220) (indicating which signals are contained in the signal blocks for each j=1, . . . , b) are combined and compared to determine for which indices i=1, . . . , N the signals are good or bad.

At block (302), information from previous epochs that is indexed via clock signal (input 310) from clock 109 of the multiple faulty global navigation satellite signal detecting system 100 is stored in memory 112. At each epoch, block (302) provides old metadata to block (301) (indexed by j= 1, . . . , b) via 320j. Further block (302) stores new metadata computed in block (301) via 330j. The process of block (301) may be applied independently for each different signal block indexed by j=1, . . . , b, at each epoch. The data repository of the epoch information stored at block (302) includes prior headings, prior integer ambiguity vectors, and prior covariance matrices. Further as illustrated in FIG. 3, a then current output 350 of the epoch information stored at block (302) is provided.

At block (305) of block (301), the single or double-differenced signal data and covariance matrix for signal block j, along with the satellite-geometry data for satellites i=1, . . . , N from output $143_i$ as well as the navigation data input 145 of block (144) and (146) of block diagram 130 is used to compute an integer-ambiguity vector for signal block j by one or more of the various available methods known to those skilled in the art. At block (305), an estimate of the baseline vector in NED coordinates as well as least-squares error components associated with the estimate are then computed. These results are then passed as inputs to block (306), where an estimate of aircraft heading and various residual metrics obtained for signal block j are computed and output via $340_j$.

Figure 6:
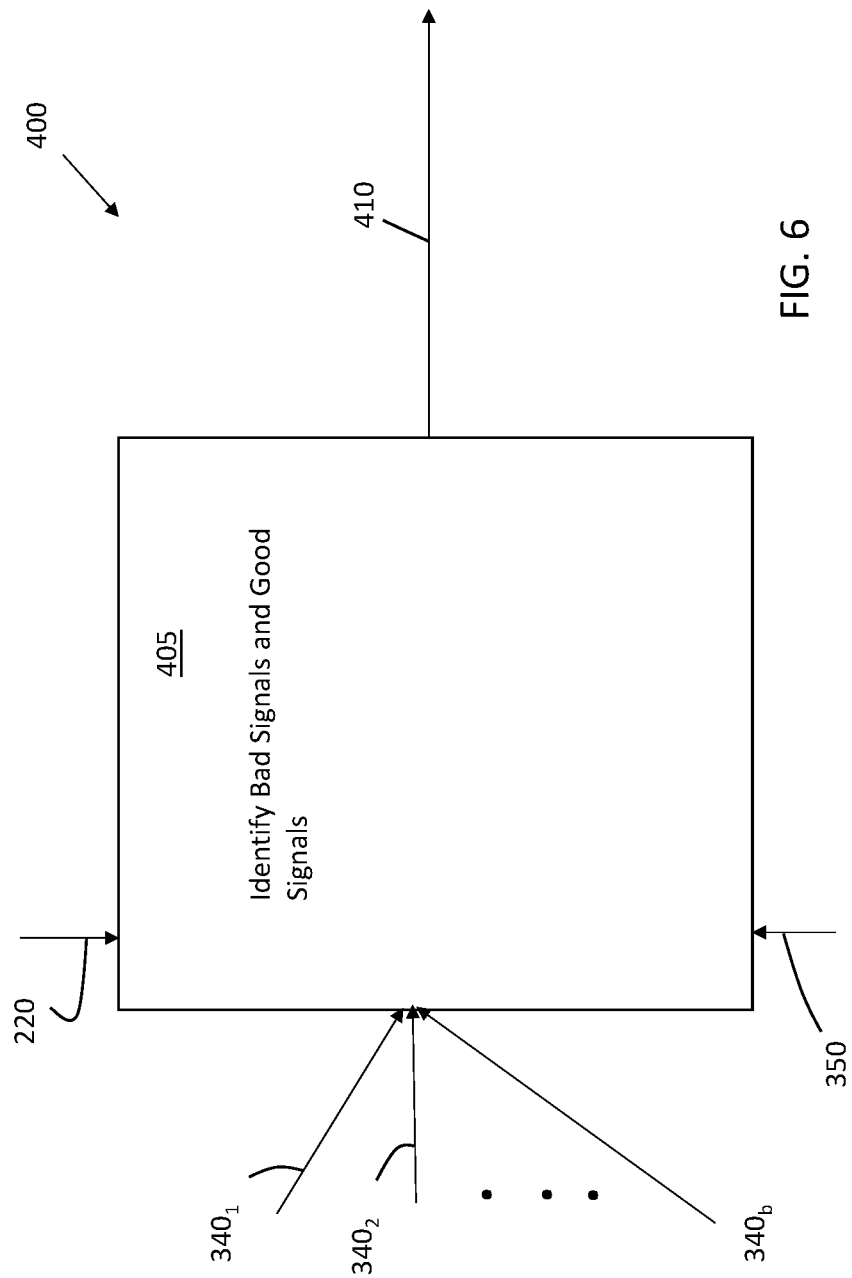
FIG. 6 is a bad and good signal block diagram according to one embodiment.

The outputs $340_j$ for j=1, . . . , b of block diagram 300 are combined and compared at each epoch in block (405) in the bad and good signal block diagram 400 of FIG. 6 to determine which signals indexed by i=1, . . . , N are good and which are bad. The output 410 computed at each epoch clearly depends on the composition of the signal blocks, so 220 from block (202) of block diagram 200 is required. The output 410 of block (405) will also depend on stored metadata from previous epochs. That metadata is provided by the input 350 from block (302) of block diagram 300.

The determination of which signals (single or double differences) are bad is a two-step process in an example embodiment. First, for each index j=1, . . . , b we find the integer ambiguity vector for the signals in block j. This produces a phase single or double-difference vector, from which we compute estimated NED coordinates for the baseline vector and an associated heading solution. Signal block j is bad based on failing at least one of three tests. The first test is a heading comparison: if the heading solution computed using block j is significantly different from a prediction of heading based on previous solutions given in the metadata 350, then signal block j is bad. The second test is a satellite geometry comparison: if the satellite geometry computed from the block j vector solution is inconsistent with the actual satellite geometry, then signal block j is bad. The third test is a baseline test: if the estimated baseline length computed using block j has too large an error when compared to the known baseline, then signal block j is bad. Signal block j is called good if all these errors are within user-selected bounds. Second, by taking the union of signals in all the good blocks we find the set of good signals. The signals in the complementary set, the union of signals in all the bad blocks are bad.

The signal blocks may be constructed so that if there are m or fewer signals that are bad (for specified m is greater than one), then the union of signals in good blocks is exactly the set of good signals. This property of blocks is called the complementary separability (CS) property. For example, for a case where m=2, signal blocks with the CS property may be constructed when there are fewer than 334 available satellite signals described in the following manner, using the mathematical language of balanced incomplete block designs (BIBDs). For an even number of satellite signals, the signal blocks are obtained by constructing a BIBD associated with a residualized Hadamard designs for values of t=4,5,6 . . . . When there is an odd number of satellite signals, the signal blocks may be obtained by constructing the complementary BIBD associated with the residuals of complements of Hadamard designs for t=5,6,7, . . . . These BIBDs have the CS property. The limitation of 334 satellites is a consequence of the fact that, at this time, no Hadamard matrix of size 668 is known to exist though these matrices are known to exist for all smaller sizes. For the case m=3, the signal blocks can be constructed when there are fewer than 43 available satellite signals in the following manner. Given v satellites, we start by finding the integer t such that v=3t−c for c=0, 1 or 2. For values of t from 4 to 14 we can construct BIBDs having v=3t , b=number of blocks=3(3t−1), k=number of satellites per block=t, each satellite is contained in exactly r=3t−1 blocks, and every pair of satellites is contained in exactly t−1 blocks. Those BIBDs have the desired complementary separability (CS) property (so the union of all good blocks is the set of good satellites). Furthermore, by removing c=1 or 2 satellites from that BIBD, we are left with pairwise balanced designs for 3t−1 or 3t−2 satellites that also have the CS property. These pairwise balanced designs form the collection of blocks we need for v=3t−1 or v=3t−2 satellite cases, t=4 to 14. For the case of 32 GPS satellites in orbit, these explicit solutions allow implementation for the cases m=2 and 3. Generalizations of the example methods outlined above can be used for constructions of signal blocks to handle the cases of more available satellites and larger values of m.

EXAMPLE EMBODIMENTS

Example 1 includes a multiple faulty global navigation satellite signal detecting system, the system includes at least one pair of spaced antennas, at least one aiding source and processor. The at least one pair of spaced antennas are configured to receive satellite signals from a plurality of satellites. The at least one aiding source is used to generate aiding source position estimate signals and heading rate signals. The processor is in communication with each antenna and the at least one aiding source. The processor is configured to, determine an estimate of a fractional difference in a carrier phase and standard deviation for each satellite signal received by the spaced antennas to generate single-difference signals with noise levels, determine a unit vector in a direction of an associated satellite in north-east-down (NED) coordinates from the received satellite signals and an aiding source position estimate signal from the at least one aiding source, determine difference signals by at least selecting a list of good single-difference signals with noise levels to use in a current epoch, determine signals blocks, the signal blocks being a collection of subsets of the determined difference signals and a covariance matrix for the difference signals, determine which difference signals are bad by, determining an integer ambiguity vector for the signals in each signal block to generate a phase difference vector, determining estimated NED coordinates for a baseline vector and an associated heading solution from the phase difference vector, comparing at least one of, a determined heading solution with a predicted heading solution based on previous solutions and heading rate signals, a geometry of the determined NED coordinates with satellite coordinates and an estimated baseline length with a known baseline length, and generate a union of good signals from all the good blocks and a complementary set of bad signals based on the comparison.

Example 2, includes the system of Example 1, wherein signals are considered good if a difference found during the comparisons is within user select bounds Example 3 includes the system of any of the Examples 1-2, wherein the determined difference signals are double-difference signals, the double-difference signals determined by subtracting one of the good single-difference signals identified as a reference single-difference from all the other single-difference signals.

Example 4 includes the system of any of the Examples 1-3, further including a memory to store at least epoch information, the processor in communication with the memory; and a clock in communication with the processer, a signal from the clock used to index the epoch information in the memory.

Example 5 includes the system of any of the Examples 1-4, wherein the epoch information is at least one of headings, integer ambiguity vectors and covariance matrices.

Example 6 includes the system of any of the Examples 1-5, wherein navigation information from the union of good signals are used at least in part for vehicle control.

Example 7 includes a method of detecting multiple faulty global navigation satellite signals. The method includes determining an estimate of a fractional difference in a carrier phase and standard deviation for each satellite signal received by spaced antennas to generate single-difference signals with noise levels; determining a unit vector in a direction of an associated satellite in north-east-down (NED) coordinates from the received satellite signals and an aiding source position estimate signal from at least one aiding source; determining difference signals by at least selecting a list of good single-difference signals with noise levels to use in a current epoch; determining signals blocks, the signal blocks being a collection of subsets of the determined difference signals and a covariance matrix for the difference signals, determining which difference signals are bad by, determining an integer ambiguity vector for the signals in each signal block to generate a phase difference vector, determining estimated NED coordinates for a baseline vector and an associated heading solution from the phase difference vector, comparing at least one of, a determined heading solution with a predicted heading solution based on previous solutions, a geometry of the determined NED coordinates with satellite coordinates, and an estimated baseline length with a known baseline length, and generating a union of good signals from all the good blocks and a complementary set of bad signals based on the comparisons.

Example 8 includes the method of Example 7, wherein signals are considered good if a difference found during the comparisons is within user select bounds Example 9 includes the method of any of the Examples 7-8, wherein the determined difference signals are double-difference signals, the double-difference signals determined by subtracting one of the good single-difference signals identified as a reference single-difference from all the other single-difference signals.

Example 10 includes the method of any of the Examples 7-9, further including, storing epoch information in a memory and indexing the epoch information with a clock signal.

Example 11 includes the method of any of the Examples 7-10, wherein the epoch information is at least one of headings, integer ambiguity vectors and covariance matrices.

Example 12 includes the method of any of the Examples 7-11, further using only the generate union of good signals in determining at least heading of a vehicle.

Example 13 includes a method of detecting multiple faulty global navigation satellite signals. The method includes determining an estimate of a fractional difference in carrier phase and standard deviation between each satellite signal from each satellite of a plurality of satellites received at a pair of spaced antennas; determine a unit vector from each satellite in north-east-down (NED) coordinates associated with each satellite signal; determining NED coordinates of a baseline length between the pair of spaced antennas using a pitch and roll vector from an inertial navigation system; determining a covariance matrix for one of single-difference and double-difference data using the determined estimate of a fractional difference in carrier phase and standard deviation and a select reference signal; building blocks of one of single-difference and double difference data and covariance matrices; determining integer ambiguity estimate baseline vectors for each signal block using at least one of the single-difference and double difference data and covariance matrices, the unit vector from each satellite in NED coordinates associated with each satellite signal and the determined NED coordinates of a baseline length between the pair of spaced antennas using the pitch and roll vector; determining an estimate of heading and residual metrics based on the determined integer ambiguity estimate baseline vectors; identifying at least one of bad signals and good signals using the determined estimate of heading and residual metrics, an identification of signals contained in the building blocks of the one of signal difference and double difference data and stored data; and using only good signals in determining navigation information.

Example 14 includes the method of Example 13 wherein building blocks of single-difference and double-difference data further includes building epochs of signal blocks, each signal block being a collection of subsets per epoch of the determined fractional difference of carrier phase in covariance matrices.

Example 15 includes the method of Example 14, further including selecting a list of good single-difference signals to use in a current epoch.

Example 16 includes the method of any of the examples 14-15, further including storing epoch information in a memory; and indexing the epoch information with a clock signal.

Example 17 includes the method of example 16, wherein the epoch information is at least one of headings, integer ambiguity vectors and covariance matrices.

Example 18 includes the methods of any of the Examples 13-17, further comprising determining carrier phase noise level in each satellite signal.

Example 19 includes the method of any of the Examples 13-18, wherein determining a unit vector from each satellite in NED coordinates associated with each satellite signal is accomplished from the received satellite signals and an inertial navigation system (INS).

Example 20 includes the method of any of the examples, wherein navigation information is used at least in part for vehicle control.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A system comprising:
at least one pair of spaced antennas configured to receive global navigation satellite signals from a plurality of satellites;
at least one aiding source to generate aiding source position estimate signals and heading rate signals;
a processor in communication with each antenna and the at least one aiding source, the processor configured to;
determine an estimate of a fractional difference in a carrier phase and corresponding standard deviation for each satellite signal received by the spaced antennas to generate single-difference signals with corresponding noise levels,
determine a unit vector in a direction of an associated satellite in north-east-down (NED) coordinates from the received satellite signals and an aiding source position estimate signal from the at least one aiding source, determine difference signals by at least selecting a list of good single-difference signals with noise levels from a previous epoch to use in a current epoch, determine signals blocks, the signal blocks being a collection of subsets of the determined difference signals and a covariance matrix for the difference signals, wherein the signal blocks are determined by constructing balanced incomplete block designs (BIBDs), determine which difference signals are bad by;
 determining an integer ambiguity vector for the signals in each signal block to generate a phase difference vector,
 determining estimated NED coordinates for a baseline vector and an associated heading solution from the phase difference vector,
 comparing at least one of;
  a determined heading solution with a predicted heading solution based on previous solutions and heading rate signals,
  a geometry of the determined NED coordinates with satellite coordinates, and
  an estimated baseline length with a known baseline length, and
generate a union of good signals from all the good blocks and a complementary set of bad signals based on the comparisons, to detect and exclude one or more faulty satellite signals.

2. The system of claim 1, wherein signals are considered good if a difference found during the comparisons is within user select bounds.

3. The system of claim 1, wherein the determined difference signals are double-difference signals, the double-difference signals determined by subtracting one of the good single-difference signals identified as a reference single-difference from all the other single-difference signals.

4. The system of claim 1, further comprising:
 a memory to store at least epoch information, the processor in communication with the memory; and
 a clock in communication with the processor, a signal from the clock used to index the epoch information in the memory.

5. The system of claim 1, wherein the epoch information is at least one of headings, integer ambiguity vectors, and covariance matrices.

6. The system of claim 1, wherein navigation information from the union of good signals are used at least in part for vehicle control.

7. A method comprising:
 determining an estimate of a fractional difference in a carrier phase and corresponding standard deviation for each satellite signal received by spaced antennas to generate single-difference signals with corresponding noise levels;
 determining a unit vector in a direction of an associated satellite in north-east-down (NED) coordinates from the received satellite signals and an aiding source position estimate signal from at least one aiding source;
 determining difference signals by at least selecting a list of good single-difference signals with noise levels from a previous epoch to use in a current epoch;
 determining signals blocks, the signal blocks being a collection of subsets of the determined difference signals and a covariance matrix for the difference signals, wherein the signal blocks are determined by constructing balanced incomplete block designs (BIBDs);
 determining which difference signals are bad by:
  determining an integer ambiguity vector for the signals in each signal block to generate a phase difference vector,
  determining estimated NED coordinates for a baseline vector and an associated heading solution from the phase difference vector,
  comparing at least one of;
   a determined heading solution with a predicted heading solution based on previous solutions,
   a geometry of the determined NED coordinates with satellite coordinates, and
   an estimated baseline length with a known baseline length, and
generating a union of good signals from all the good blocks and a complementary set of bad signals based on the comparisons, to detect and exclude one or more faulty satellite signals.

8. The method of claim 7, wherein signals are considered good if a difference found during the comparisons is within user select bounds.

9. The method of claim 7, wherein the determined difference signals are double-difference signals, the double-difference signals determined by subtracting one of the good single-difference signals identified as a reference single-difference from all the other single-difference signals.

10. The method of claim 7, further comprising:
 storing epoch information in a memory; and
 indexing the epoch information with a clock signal.

11. The method of claim 7, wherein the epoch information is at least one of headings, integer ambiguity vectors, and covariance matrices.

12. The method of claim 7, further comprising:
 using only the generate union of good signals in determining at least heading of a vehicle.

13. A method comprising:
 determining an estimate of a fractional difference in carrier phase and corresponding standard deviation between each satellite signal from each satellite of a plurality of satellites received at a pair of spaced antennas;
 determining a unit vector from each satellite in north-east-down (NED) coordinates associated with each satellite signal;
 determining NED coordinates of a baseline length between the pair of spaced antennas using a pitch and roll vector from an inertial navigation system;
 determining a covariance matrix for one of single-difference and double-difference data using the determined estimate of a fractional difference in carrier phase and standard deviation and a select reference signal;
 building signal blocks of one of single-difference and double-difference data and covariance matrices, wherein the signal blocks are built using mathematical combinatorics including complementary separability, balanced incomplete block designs (BIBDs), and Hadamard designs;
 determining integer ambiguity estimate baseline vectors for each signal block using at least one of the single-difference and double-difference data and covariance matrices, the determined unit vector from each satellite in NED coordinates associated with each satellite signal, and the determined NED coordinates of a baseline length between the pair of spaced antennas using the pitch and roll vector;

determining an estimate of heading and residual metrics based on the determined integer ambiguity estimate baseline vectors;

identifying at least one of bad signals and good signals using the determined estimate of heading and residual metrics, an identification of signals contained in the building blocks of the one of single-difference and double-difference data, and stored data, to detect and exclude one or more faulty satellite signals; and using only good signals in determining navigation information.

14. The method of claim 13, wherein building signal blocks of single-difference and double-difference data further comprises:

building epochs of signal blocks, each signal block being a collection of subsets per epoch of the determined fractional difference of carrier phase in covariance matrices.

15. The method of claim 14, further comprising:
selecting a list of good single-difference signals from a previous epoch to use in a current epoch.

16. The method of claim 14, further comprising:
storing epoch information in a memory; and
indexing the epoch information with a clock signal.

17. The method of claim 16, wherein the epoch information is at least one of headings, integer ambiguity vectors, and covariance matrices.

18. The method of claim 13, further comprising:
determining carrier phase noise level in each satellite signal.

19. The method of claim 13, wherein determining a unit vector from each satellite in NED coordinates associated with each satellite signal is accomplished from the received satellite signals and an inertial navigation system (INS).

20. The method of claim 13, wherein navigation information is used at least in part for vehicle control.

* * * * *